(12) United States Patent
Esaka

(10) Patent No.: US 8,818,750 B2
(45) Date of Patent: Aug. 26, 2014

(54) ELECTRONIC DEVICE, POSITIONING METHOD, AND COMPUTER PROGRAM PRODUCT

(75) Inventor: Naoki Esaka, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 461 days.

(21) Appl. No.: 13/204,348

(22) Filed: Aug. 5, 2011

(65) Prior Publication Data
US 2012/0158352 A1 Jun. 21, 2012

(30) Foreign Application Priority Data

Dec. 21, 2010 (JP) ................................. 2010-284948

(51) Int. Cl.
*G06F 3/01* (2006.01)
*G06F 3/0346* (2013.01)
*G06F 3/0488* (2013.01)

(52) U.S. Cl.
CPC ............ *G06F 3/0488* (2013.01); *G06F 3/0346* (2013.01)
USPC ........................... 702/150; 702/155; 702/189

(58) Field of Classification Search
USPC .......... 702/150, 155, 189; 701/482, 533, 537, 701/538
See application file for complete search history.

(56) References Cited

U.S. PATENT DOCUMENTS

| 7,694,875 B2* | 4/2010 | Mitamura ...................... 235/375 |
| 8,098,544 B2* | 1/2012 | Roche et al. .................. 367/124 |
| 2009/0277958 A1* | 11/2009 | Lobo ............................. 235/380 |
| 2013/0144523 A1* | 6/2013 | Haney .......................... 701/482 |

FOREIGN PATENT DOCUMENTS

| JP | 2003271118 | 9/2003 |
| JP | 2006-105662 | 4/2006 |
| JP | 2008-092225 | 4/2008 |
| JP | 2010-124453 | 6/2010 |

OTHER PUBLICATIONS

Japanese Patent Application No. 2010-284948, Notice of Rejection, mailed Oct. 4, 2011, (with English Translation).

* cited by examiner

*Primary Examiner* — Elias Desta
(74) *Attorney, Agent, or Firm* — Blakely, Sokoloff, Taylor & Zafman LLP

(57) ABSTRACT

According to one embodiment, an electronic device includes a display module, an operation module, a communication module, an obtaining module, and a calculator. The operation module obtains operation on the display screen of the display module. The communication module communicates with another electronic device. The obtaining module obtains trace information indicating a trace of operation moving from the electronic device to the other electronic device or a trace of operation moving from the other electronic device to the electronic device based on operation on the display screen of the electronic device and operation on the display screen of the other electronic device. The calculator calculates a positional relationship between the electronic device and the other electronic device based on the trace information.

20 Claims, 5 Drawing Sheets

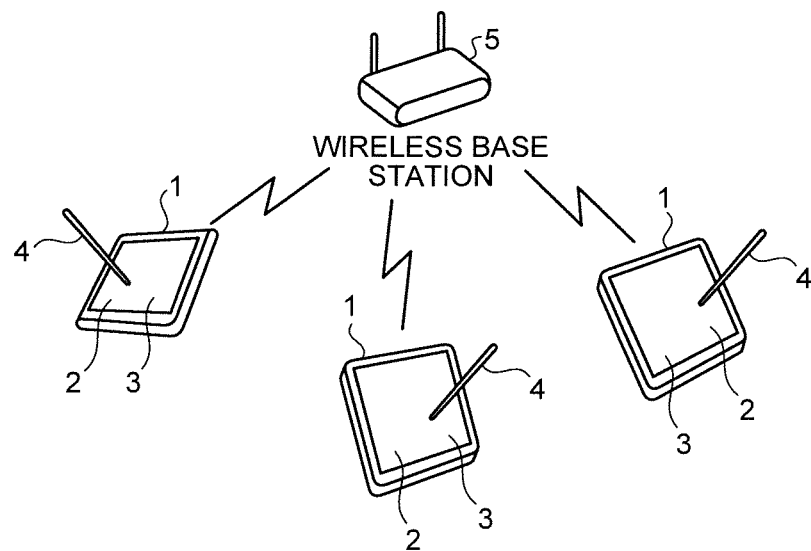
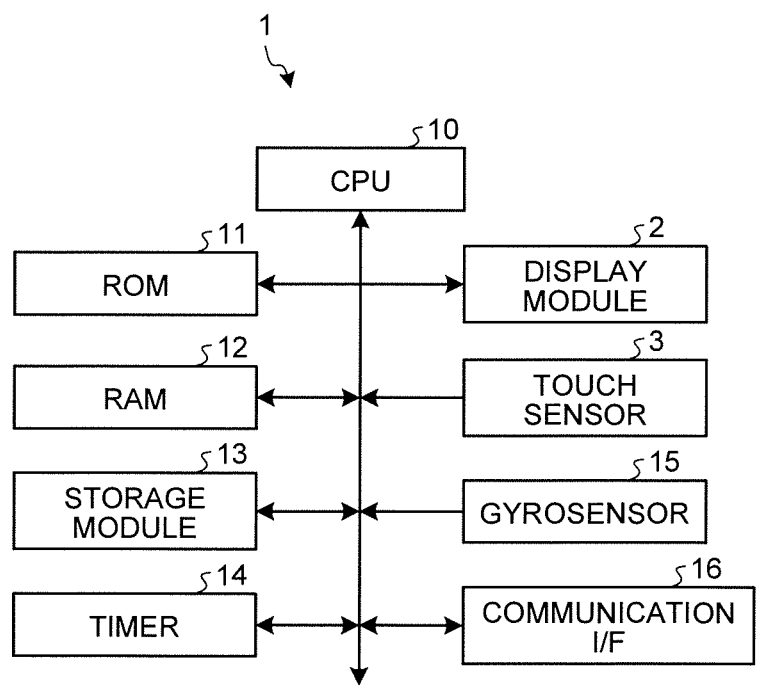

ELECTRONIC DEVICE, POSITIONING METHOD, AND COMPUTER PROGRAM PRODUCT

CROSS-REFERENCE TO RELATED APPLICATIONS

This application is based upon and claims the benefit of priority from Japanese Patent Application No. 2010-284948, filed Dec. 21, 2010, the entire contents of which are incorporated herein by reference.

FIELD

Embodiments described herein relate generally to a electronic device, a positioning method, and a computer program product.

BACKGROUND

Some electronic devices are capable of recognizing the positional relationship of a plurality of electronic devices based on the communication state. Examples of such electronic devices include mobile telephones such as smartphones, personal digital assistants (PDAs), personal computers (PCs), and television broadcast receivers. For example, such an electronic device measures a distance to an adjacent electronic device based on the radio electric field strength of wireless communication, the delay time, and the like, and determines the position of the adjacent electronic device based on the measurement result. The electronic device then sets a specific electronic device to a reference coordinate system and determines the position of each electronic device.

With the conventional technology descried above, in the case of, for example, wireless communication, high positioning accuracy cannot be expected due to a multipath issue and the like. Besides, in the case of infrared communication, because of the strong directivity, if devices face each other such that a light emitter and a light receiver come face to face with each other, the positional relationship can be defined. On the other hand, if the light emitter and the light receiver are not in a face-to-face position, or there is an obstacle between the devices, it is not easy to determine the accurate positional relationship.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

FIG. 1 is an exemplary conceptual diagram illustrating communication among a plurality of electronic devices according to an embodiment;

FIG. 2 is an exemplary block diagram of an electronic device in the embodiment;

DETAILED DESCRIPTION

Figure 3:
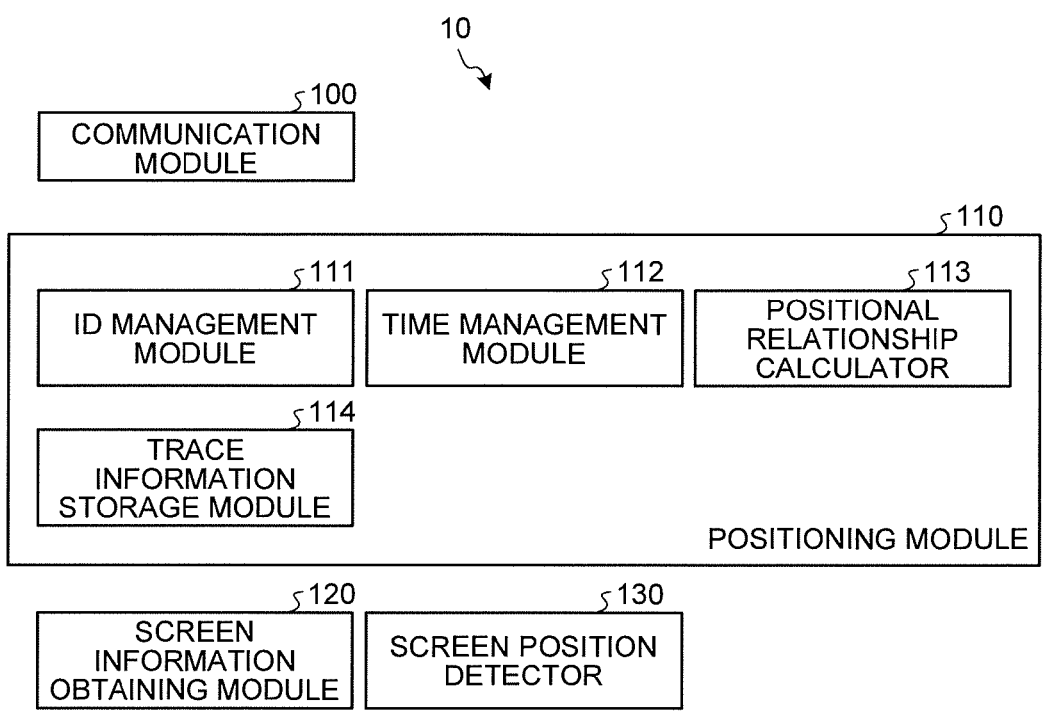
FIG. 3 is an exemplary functional block diagram of a central processing unit (CPU) in the embodiment.

In general, according to one embodiment, an electronic device comprises a display module, an operation module, a communication module, an obtaining module, and a calculator. The operation module is configured to obtain operation on the display screen of the display module. The communication module is configured to communicate with another electronic device. The obtaining module is configured to obtain trace information indicating a trace of operation moving from the electronic device to the other electronic device or a trace of operation moving from the other electronic device to the electronic device based on operation on the display screen of the electronic device and operation on the display screen of the other electronic device. The calculator is configured to calculate a positional relationship between the electronic device and the other electronic device based on the trace information.

Exemplary embodiments will be described in detail below with reference to the accompanying drawings. The electronic device of the embodiments may be, for example, a mobile telephone such as smartphone, a personal digital assistant (PDA), a personal computer (PC), or a television broadcast receiver. A tablet electronic device will be described by way of example that is provided with a touch sensor layered on top of the display screen such as a liquid crystal display (LCD) to receive operation input.

FIG. 1 is a conceptual diagram illustrating communication among a plurality of electronic devices 1 according to an embodiment. As illustrated in FIG. 1, each of the electronic devices 1 comprises a display module 2 such as LCD and a touch sensor 3 layered on top of the display screen of the display module 2 to receive operation with a stylus pen 4 or the like. In the electronic devices 1, the touch sensor 3 receives a touch by the user on the display screen of the display module 2. For example, if the user touches the display screen of the display module 2 with the stylus pen 4, the touch sensor 3 detects the touch point, and receives operation input corresponding to the touch point. If the user moves the touch point while touching the display screen of the display module 2 with the stylus pen 4, the touch sensor 3 receives operation input corresponding to the shift of the touch point.

The electronic device 1 has the function of communicating the other electronic devices 1 via a wireless base station 5. The electronic device 1 may communicate with the wireless base station 5 via, for example, a wireless local area network (LAN). The electronic device 1 may communicate with the other electronic devices 1 in peer-to-peer fashion without involving the wireless base station 5 in ad-hoc mode. While the electronic device 1 will be described herein as performing wireless communication via a wireless LAN or the like, this is by way of example only. The electronic device 1 may of course perform wired communication.

FIG. 2 illustrates an example of a configuration of the electronic device 1 of the embodiment. As illustrated in FIG. 2, the electronic device 1 comprises, in addition to the display module 2 and the touch sensor 3 described above, a central processing unit (CPU) 10, a read only memory (ROM) 11, a random access memory (RAM) 12, a storage module 13, a timer 14, a gyrosensor 15, and a communication interface (I/F) 16.

The CPU 10 controls the overall operation of the electronic device 1. The CPU 10 loads programs stored in the ROM 11 or the storage module 13 into the work area of the RAM 12 and sequentially executes the programs, thereby outputting a control signal to each of modules of the electronic device 1 connected via a bus line. The ROM 11 stores various programs and setting data. The RAM 12 provides the work area to the CPU 10. The storage module 13 may be a large capacity storage device such as a hard disk drive (HDD), a solid state drive (SSD), or the like. The storage module 13 stores application programs to be executed by the CPU 10 and various types of data including letters, characters, moving images, still images, and audio in a readable/writable manner. The timer 14 has the real-time clock function and the time synchronization function via a network. The timer 14 counts the time as well as synchronizing the time at time S1. The CPU 10 is notified of the time synchronized and counted by the timer 14.

The gyrosensor (gyroscope) 15 is a MEMS vibratory acceleration sensor. The gyrosensor 15 senses the orientation or movement of the electronic device 1 on three axes including X (pitch), Y (roll), and Z (yaw), and outputs the detection result to the CPU 10. Under the control of the CPU 10, the communication I/F 16 performs wired or wireless communication according to a predetermined communication protocol. For example, under the control of the CPU 10, the communication I/F 16 performs wireless LAN communication via the wireless base station 5.

Described below are functional modules that are implemented by programs sequentially executed by the CPU 10. FIG. 3 is a functional block diagram of the CPU 10. As illustrated in FIG. 3, by sequentially executing the programs, the CPU 10 implements a communication module 100, a positioning module 110, a screen information obtaining module 120, and a screen position detector 130.

The communication module 100 communicates with the other electronic devices 1 via the communication I/F 16 according to a predetermined communication protocol. In the embodiment, the communication module 100 communicates with the other electronic devices 1 based on a standard such as IEEE 802.11 wireless LAN standard.

The positioning module 110 comprises an ID management module 111, a time management module 112, a positional relationship calculator 113, and a trace information storage module 114. The positioning module 110 determines the positional relationship of the electronic devices 1 that communicate one another via the communication I/F 16 based on operation related to positioning (details will be described later). The term "positional relationship" as used herein refers to the direction, distance, and orientation of a device with respect to another device as a reference. For example, the positional relationship between the reference electronic device 1 and the other electronic device 1 may indicate the direction of the other electronic device 1 with respect to the reference electronic device 1, the distance to the reference electronic device 1, and the orientation of the other electronic device 1.

The ID management module 111 manages identification information (ID) with respect to each of the other electronic devices 1 that the electronic device 1 communicates with via the communication I/F 16. The identification information may be any information that is uniquely assigned to each device and identifies the device such as device name, communication address, and the like. Examples of the identification information include a media access control (MAC) address for communication via the communication I/F 16. If the identification information is device name, the ID management module 111 manages the association between a device name and the communication address of the device identified by the device name. Meanwhile, if the identification information is communication address, the ID management module 111 manages a list of communication addresses of the electronic devices 1. Accordingly, when the electronic device 1 communicates with the other electronic device 1 via the communication I/F 16, the other electronic device 1 can be specified by referring to the identification information managed by the ID management module 111.

The time management module 112 manages the time at which operation related to positioning is performed. More specifically, the time management module 112 obtains the start time at which operation related to positioning starts and the end time at which the operation ends from the timer 14, and temporarily stores the start time and the end time in the RAM 12 or the like.

The positional relationship calculator 113 calculates the positional relationship of the electronic devices 1 based on trace information stored in the trace information storage module 114 as a trace of operation related to positioning among the electronic devices 1. Details of the positional relationship calculator 113 and the trace information storage module 114 will be described later with reference to FIGS. 4 to 8.

The screen information obtaining module 120 obtains operation on the display screen of the electronic device 1 and also operation on the display screen of the other electronic devices 1. More specifically, the screen information obtaining module 120 obtains operation on the display screen of the electronic device 1 based on the output of the touch sensor 3. Further, the screen information obtaining module 120 receives the output of the touch sensor 3 of the other electronic devices 1 through communication via the communication I/F 16 and thereby obtains operation on the display screen of the other electronic devices 1.

The screen position detector 130 detects the orientation of the electronic device 1 (the position of the display module 2) and the orientation of the other electronic devices 1. More specifically, the screen position detector 130 detects the orientation of the electronic device 1 based on the output of the gyrosensor 15. Further, the screen position detector 130 receives the output of the gyrosensor 15 of the other electronic devices 1 through communication via the communication I/F 16 and thereby detects the orientation of the other electronic devices 1.

A detailed description will be given of the operation of the electronic device 1 configured as above upon positioning the electronic devices 1 that communicate with one another via the wireless base station 5. Examples of the positioning of the electronic device 1 include positioning of smartphones of meeting attendants upon a meeting in a meeting room, the positioning of a plurality of television broadcast receivers installed in a room, and the like. In the following, for the simplicity of the description, the ad-hoc positioning of the three electronic devices 1 of users will be exemplified (see FIGS. 5 to 8). It is assumed herein that the three electronic devices 1 are placed on a table or the like and do not change in the orientation during the positioning. It is also assumed herein that one user performs operation related to positioning by sequentially operating the three electronic devices 1.

Figure 4:
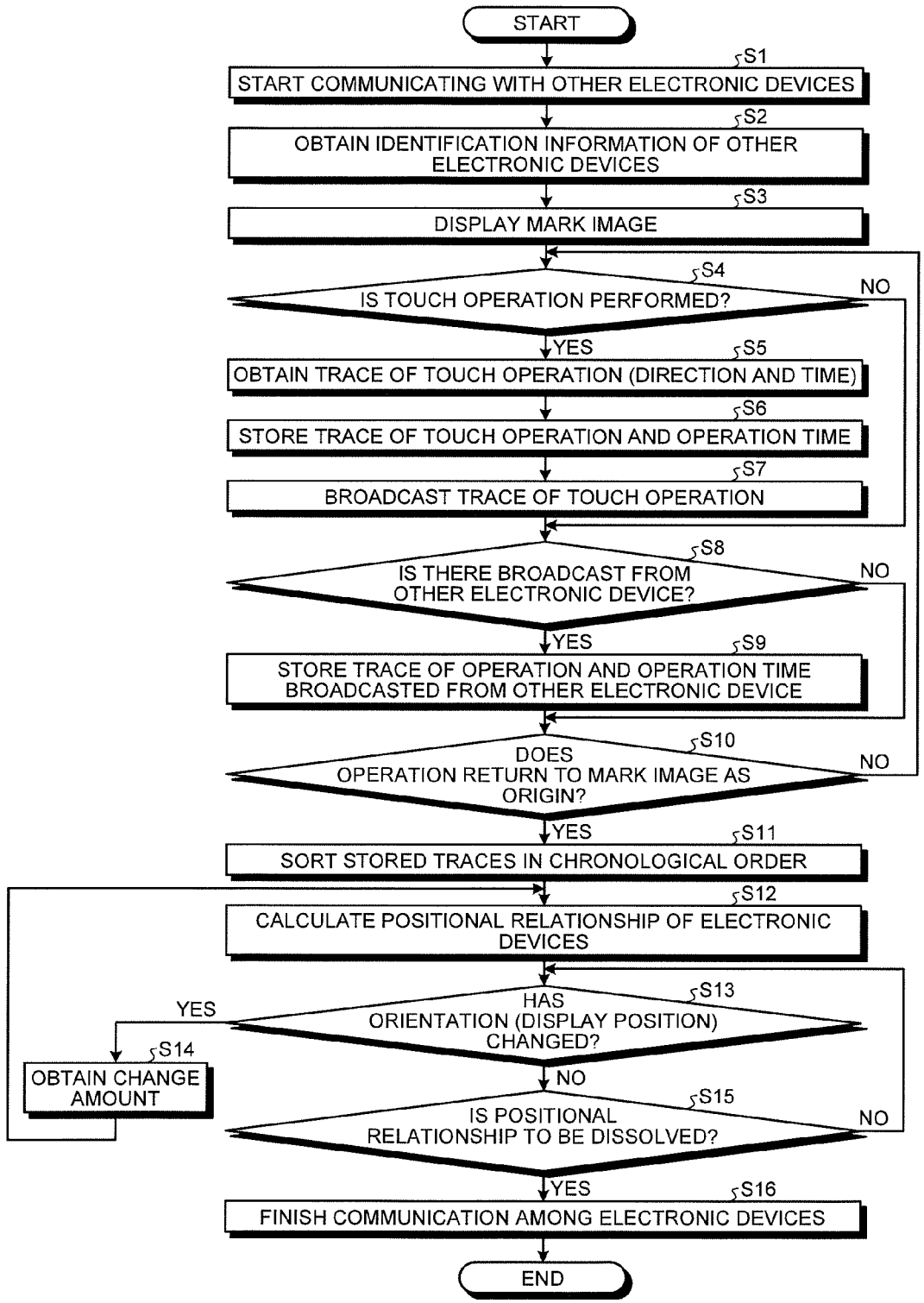
FIG. 4 is an exemplary flowchart of the operation of the electronic device in the embodiment.

FIG. 4 is a flowchart of an example of the operation of the electronic device according to the embodiment. As illustrated in FIG. 4, when the process starts in response to operation related to positioning among devices or the like, the communication module 100 starts communicating with the other electronic devices 1 via the wireless base station 5 (S1). The communication module 100 then obtains identification information (device ID) of the other electronic devices 1 communication with which starts at S1 (S2). In the embodiment, for example, device name is obtained as the identification information. The ID management module 111 manages the obtained device name together with the MAC address and the like.

Figure 5:
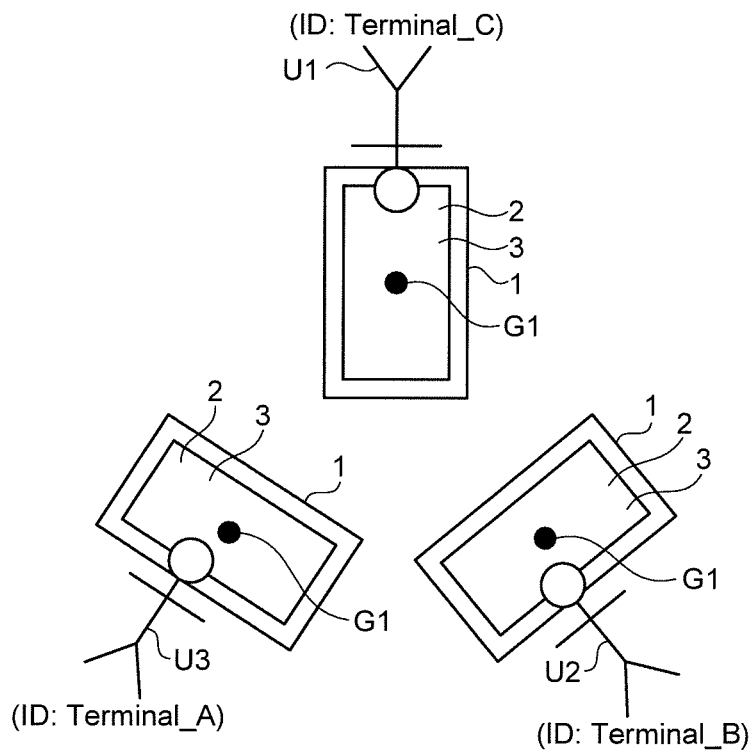
FIG. 5 is an exemplary conceptual diagram for explaining positioning among three electronic devices in the embodiment.

FIGS. 5 to 8 are conceptual diagrams for explaining the positioning among the three electronic devices 1. As illustrated in FIGS. 5 to 8, the three electronic devices 1 of users U1 to U3 perform the process as illustrated in FIG. 4 in response to operation for positioning among devices. By the process at S1 and S2, as illustrated in FIG. 5, the three electronic devices 1 each obtain the identification information of the electronic device 1 of the user U1 "Terminal_C", the identification information of the electronic device 1 of the user U2 "Terminal_B", and the identification information of the electronic device 1 of the user U3 "Terminal_A". The ID management module 111 manages the identification information.

After that, the CPU 10 displays a mark image G1 as a reference of operation related to positioning at a predetermined position on the display screen of the display module 2 (S3). As illustrated in FIG. 5, the mark image G1 is displayed near the center of the display screen of the display module 2.

The operation related to positioning will be described in detail below. The operation related to positioning refers to operation by one of the users U1 to U3 moving from the mark image G1 as an origin (start point), sequentially passing through the other mark images G1, and returning to the mark image G1 as an origin.

Figure 6:
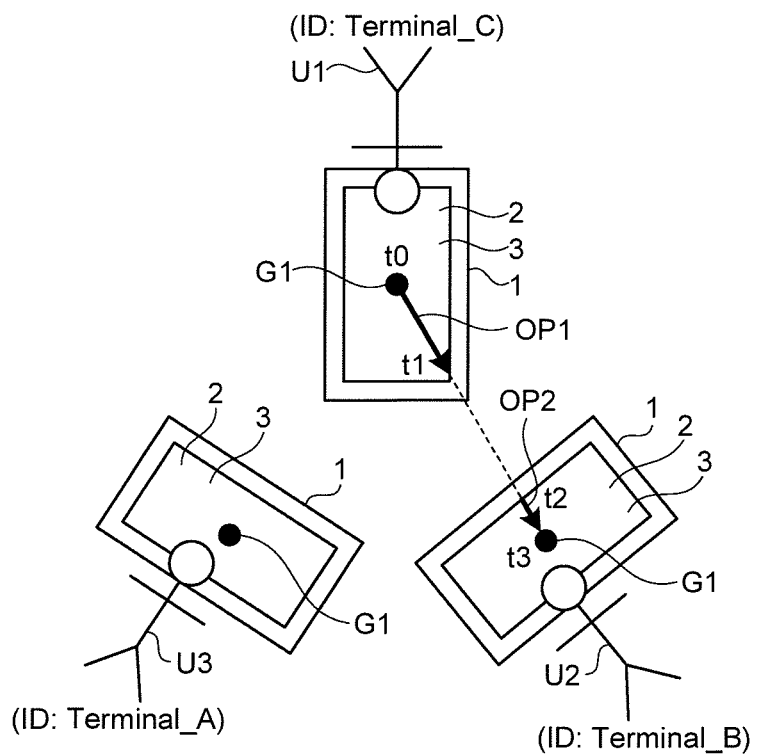
FIG. 6 is another exemplary conceptual diagram for explaining positioning among three electronic devices in the embodiment.

More specifically, as illustrated in FIG. 6, a user performs operation OP1 in which he/she slides the mark image G1 as an origin displayed on the electronic device 1 identified as "Terminal_C" to an edge of the display screen in the direction of the electronic device 1 "Terminal_B" while touching the mark image G1. It is assumed herein that the operation OP1 starts at time t0 and ends at time t1.

Subsequently, the user who performs the operation OP1 moves to the electronic device 1 "Terminal_B" to perform operation OP2 in which he/she touches an edge of the display screen in the direction of the "Terminal_C" and slides the touch point to the mark image G1. It is assumed herein that the operation OP2 starts at time t2 and ends at time t3. For the electronic device 1 "Terminal_C", the operations OP1 and OP2 are to move to the other electronic device 1 therefrom. On the other hand, for the electronic device 1 "Terminal_B", the operations OP1 and OP2 are to move from the other electronic device 1 thereto. The slide directions and a period from the time t0 to t3 in the operations OP1 and OP2 are the trace information indicating a trace of the operations.

Figure 7:
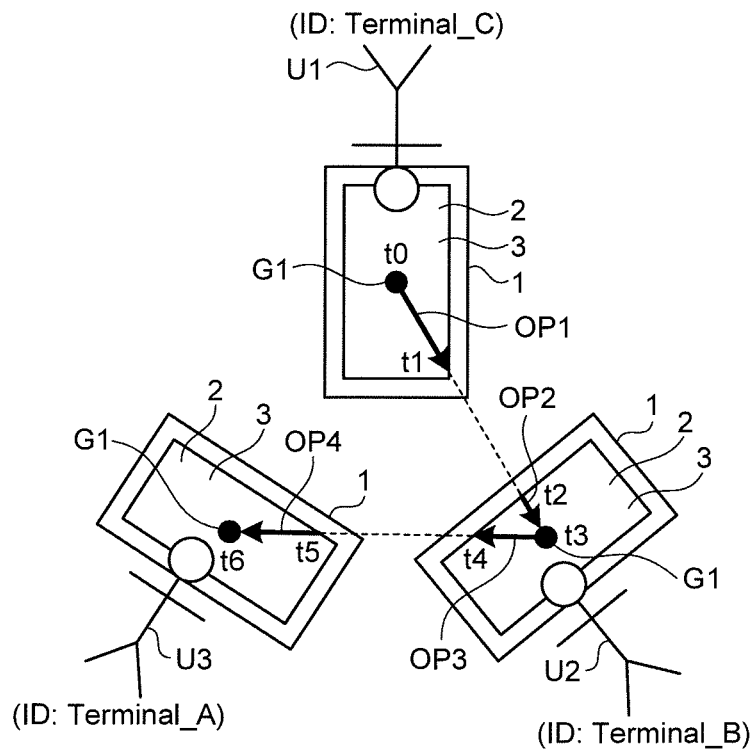
FIG. 7 is still another an exemplary conceptual diagram for explaining positioning among three electronic devices in the embodiment.

Next, as illustrated in FIG. 7, the user who performs the operation OP2 performs operation OP3 in which he/she slides the mark image G1 displayed on the "Terminal_B" to an edge of the display screen in the direction of the electronic device 1 "Terminal_A" while touching the mark image G1. It is assumed herein that the operation OP3 starts at the time t3 and ends at time t4. Thereafter, the user who performs the operation OP3 moves to the electronic device 1 "Terminal_A" to perform operation OP4 in which he/she touches an edge of the display screen in the direction of the "Terminal_B" and slides the touch point to the mark image G1. It is assumed herein that the operation OP4 starts at time t5 and ends at time t6. For the electronic device 1 "Terminal_C", the operations OP3 and OP4 are to move from the first other electronic device 1 to the second other electronic device 1. The slide directions and a period from the time t3 to t6 in the operations OP3 and OP4 are the trace information indicating a trace of the operations.

Figure 8:
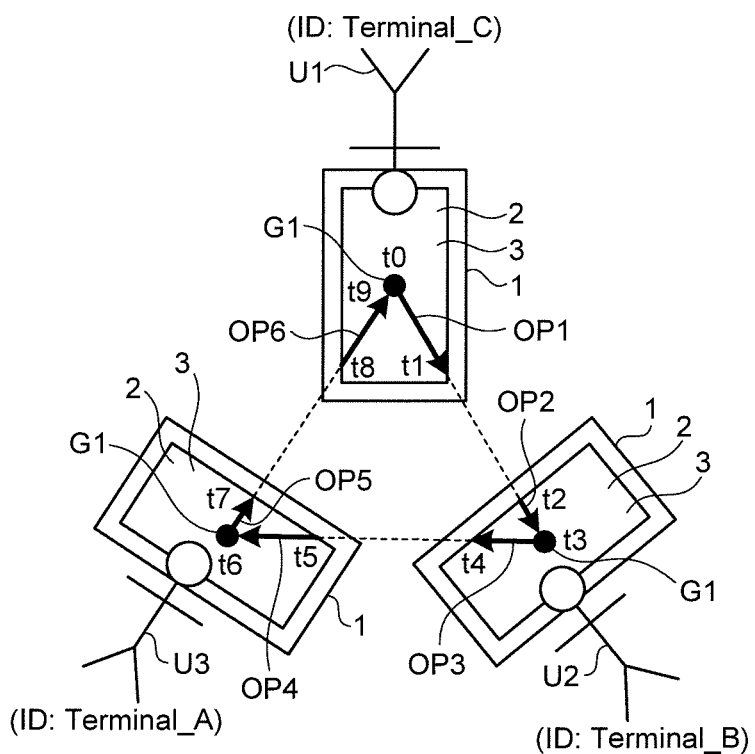
FIG. 8 is still another exemplary conceptual diagram for explaining positioning among three electronic devices in the embodiment.

After that, as illustrated in FIG. 8, the user who performs the operation OP4 performs operation OP5 in which he/she slides the mark image G1 displayed on the "Terminal_A" to an edge of the display screen in the direction of the electronic device 1 "Terminal_C" while touching the mark image G1. It is assumed herein that the operation OP5 starts at the time t6 and ends at time t7. Thereafter, the user who performs the operation OP5 moves to the electronic device 1 "Terminal_C" to perform operation OP6 in which he/she touches an edge of the display screen in the direction of the "Terminal_A" and slides the touch point to the mark image G1. It is assumed herein that the operation OP6 starts at time t8 and ends at time t9. The slide directions and a period from the time t6 to t9 in the operations OP5 and OP6 are the trace information indicating a trace of the operations. The above operations OP1 to OP6 are the operation moving from the mark image G1 as an origin, sequentially passing through the other mark images G1, and returning to the mark image G1 as an origin.

Referring back to FIG. 4, after S3, the screen information obtaining module 120 determines whether touch operation is performed on the display screen of the display module 2 based on the output of the touch sensor 3 (S4). If no touch operation is performed (No at S4), the CPU 10 moves the process to S8. On the other hand, if touch operation is performed (Yes at S4), i.e., the operation of sliding the mark image G1 to an edge of the display screen in the direction of the other electronic device 1 while touching the mark image G1 (the operation OP1, OP3, OP5), or the operation of touching an edge of the display screen and sliding the touch point to the mark image G1 (the operation OP2, OP4, OP6) is performed, the screen information obtaining module 120 obtains a trace of the operation (slide direction and time) based on the output of the touch sensor 3 (S5).

The trace information storage module 114 stores the trace of the operation and the operation time (the start time and the end time) in the PAM 12 or the like as trace information together with identification information that identifies the device on which the operation is performed (S6). The communication module 100 broadcasts the obtained trace of the operation to the other electronic devices 1 (S7), and the process moves to S8. By this broadcast, for example, the trace of the operation OP1 as illustrated in FIG. 7 is shared among the electronic device 1 "Terminal_C" and the other electronic devices 1.

The CPU 10 determines whether there is a broadcast from the other electronic device 1 based on communication in the communication module 100 (S8). If there is no broadcast from the other electronic device 1 (No at S8), the CPU 10 moves the process to S10. On the other hand, if there is a broadcast from the other electronic device 1 (Yes at S8), i.e., if touch operation is performed on the other electronic device 1, the screen information obtaining module 120 obtains a trace of the operation (slide direction and time) on the other electronic device 1 broadcasted therefrom via the communication module 100. The trace information storage module 114 stores the obtained trace of the operation on the other electronic device 1 and the operation time (the start time and the end time) in the PAM 12 or the like as trace information together with identification information that identifies the device on which the operation is performed (S9).

The CPU 10 determines whether the operation returns to the mark image G1 as an origin (start point) based on the trace information stored in the trace information storage module 114 and the identification information managed by the ID management module 111 (S10). More specifically, at S10, the CPU 10 determines whether the identification information of the electronic device 1 from which the trace information is obtained first matches the identification information of the electronic device 1 from which the trace information is obtained last. If the operation does not return to the mark image G1 as an origin (No at S10), the CPU 10 returns the process to S4 to detect touch operation on the electronic device 1 or the other electronic devices 1.

On the other hand, if the operation returns to the mark image G1 as an origin (Yes at S10), the trace information storage module 114 sorts the traces of the operations stored therein in chronological order (S11). By this sort at S11, the traces of the operations OP1 to OP6 are sorted in the order in which they are actually performed. With this, for example, the electronic device 1 "Terminal_C" can obtain the traces of the operations OP1 and OP2 to move to the other electronic device 1 therefrom. The same applies to the traces of the operations between the other electronic devices 1.

The positional relationship calculator 113 calculates the positional relationship of the electronic devices 1 based on the traces of the operations between the electronic devices 1 obtained by the sort at S11 (S12). For example, in the electronic device 1 "Terminal_C", the positional relationship calculator 113 calculates the positional relationship with the electronic devices 1 "Terminal_B" based on the traces of the operations OP1 and OP2. More specifically, in the electronic device 1 "Terminal_C", since the direction indicated by the operation OP1 corresponds to the direction of the "Terminal_B" indicated by the user, the direction is determined to be the direction of the "Terminal_B" with respect to the "Terminal_C". Besides, the direction indicated by the operation OP2 following the operation OP1 indicates the direction in which the "Terminal_B" faces with respect to the "Terminal_C". Thus, the direction indicated by the operation OP2 is determined to be the direction in which the "Terminal_B" faces with respect to the "Terminal_C".

The period from the start time (t1) of the operation OP1 to the end time (t3) of the operation OP2 is occupied mostly by the time taken by the user to move, and is in proportion to the distance between the "Terminal_C" and the "Terminal_B". Accordingly, the positional relationship calculator 113 calculates the distance between the "Terminal_C" and the "Terminal_B" by multiplying the period from the start time (t1) of the operation OP1 to the end time (t3) of the operation OP2 by a predetermined coefficient.

In the same manner, the positional relationship calculator 113 calculates the positional relationship between the "Terminal_B" and the "Terminal_A" based on the operations OP3 and OP4, and the positional relationship between the "Terminal_A" and the "Terminal_C" based on the operations OP5 and OP6. The positional relationship may be calculated by using cosine theorem or the like. More specifically, regarding a triangle formed by the mark images G1 as apices illustrated in FIG. 8, the length (distance) of a side of the triangle can be calculated from the lengths (distances) of two sides of the triangle and an interior angle (angle formed by operational directions) of the triangle.

While the case of the three electronic devices 1 is described in the embodiment, if there are four or more of the electronic devices 1, the positional relationship among the electronic devices 1 can be calculated by using cosine theorem. More specifically, the angle and the distance between an adjacent pair of the electronic devices 1 are calculated in the same manner as in the case of the three electronic devices 1. An angle to move from the electronic device 1 to the other electronic device 1 next to the adjacent electronic device 1 can be calculated by using cosine theorem from information on the distance (lengths of two sides) to the other electronic device 1 via the adjacent electronic device 1 and information on the interior angle. The distance can also be calculated by using cosine theorem. In this manner, the positional relationship between the non-adjacent electronic devices 1 is calculated by using cosine theorem. With this, the positional relationship among all the electronic devices 1 can be calculated.

The screen position detector 130 determines whether there is a change in the orientation of the electronic device 1 (the position of the display screen of the display module 2) and the orientation of the other electronic devices 1 (S13). The orientation of the electronic device 1 sometimes changes as user holds it differently. If there is a change in the orientation of the electronic device 1 and the other electronic devices 1 (Yes at S13), the screen position detector 130 obtains the change amount (angle having changed on the on three axes XYZ) from the output of the gyrosensor 15 and communication via the communication I/F 16 (S14). Then, the process returns to S12. At S12, the positional relationship among the electronic devices 1 calculated at S12 is corrected based on the change amount obtained at S14. With this correction, it is possible to handle a change in the orientation of the electronic device 1 after the calculation of the positional relationship.

More specifically, in FIG. 8, if the orientation of the electronic device 1 "Terminal_C" changes from vertical to horizontal orientation, in the electronic device 1 "Terminal_C", the direction of the electronic device 1 "Terminal_B" with respect to the "Terminal_C" is corrected to correspond to the horizontal orientation. On the other hand, in the electronic device 1 "Terminal_B", the direction in which the "Terminal_C" faces with respect to the "Terminal_B" is corrected to correspond to the horizontal orientation.

If there is no change in the orientation of the electronic device 1 and the other electronic devices 1 (No at S13), the CPU 10 determines whether the positional relationship is to be dissolved based on operation input to instruct to dissolve the positional relationship calculated at S12 or the like (S15). If the positional relationship is not to be dissolved (No at S15), the CPU 10 returns the process to S13 to continue the process. On the other hand, If the positional relationship is to be dissolved (Yes at S15), the communication module 100 finishes communicating with the other electronic devices 1 via the wireless base station 5 (S16). Then, the process ends.

As described above, according to the embodiment, the electronic device 1 comprises the screen information obtaining module 120 and the positional relationship calculator 113. The screen information obtaining module 120 obtains trace information indicating a trace of operation moving from the electronic device 1 (for example, "Terminal_C") to the other electronic device 1 (for example, "Terminal_B") based on operation (the operation OP1) on the display screen of the electronic device 1 and operation (the operation OP2) on the display screen of the other electronic device 1. The positional relationship calculator 113 calculates the positional relationship between the electronic device 1 and the other electronic device 1 based on the obtained trace information. Further, the screen information obtaining module 120 obtains trace information indicating a trace of operation moving from the other electronic device 1 (for example, "Terminal_A") to the electronic device 1 (for example, "Terminal_C") based on operation (the operation OP6) on the display screen of the electronic device 1 (for example, "Terminal_C") and operation (the operation OP5) on the display screen of the other electronic device 1 (for example, "Terminal_A"). The positional relationship calculator 113 calculates the positional relationship between the electronic device 1 and the other electronic device 1 based on the obtained trace information. Thus, the electronic device 1 can easily recognize the accurate positional relationship with the other electronic devices 1.

Besides, the screen information obtaining module 120 obtains trace information indicating a trace of operation moving from the first other electronic device 1 (for example, "Terminal_B") to the second other electronic device 1 (for example, "Terminal_A"). The positional relationship calculator 113 calculates the positional relationship among the electronic devices 1 based on the obtained trace information. Thus, it is possible to determine the positional relationship of a plurality of electronic devices.

A computer program may be executed on a computer to realize the same function as the electronic device 1. The computer program may be provided as being stored in advance in ROM or the like. The computer program may also be provided as being stored in a computer-readable storage medium, such as a compact disc-read only memory (CD-ROM), a flexible disk (FD), a compact disc recordable (CD-R), and a digital versatile disc (DVD), as a file in an installable or executable format.

The computer program may also be stored in a computer connected via a network such as the Internet so that it can be downloaded therefrom via the network. Further, the computer program may be provided or distributed via a network such as the Internet.

The computer program comprises modules that implement the elements described above. As real hardware, the CPU (processor) loads the computer program from the ROM into the main memory and executes it. With this, the above elements are implemented on the main memory.

While the orientation of the electronic device 1 is described above as being detected by a gyrosensor, it is not so limited. A change in the orientation of the electronic device 1 with respect to a reference orientation may be detected by an orientation sensor. Operation on the display screen of the electronic device 1 is not limited by the configuration of the touch sensor 3. Operation may be provided by moving a pointer or a cursor with a mouse, a trackpad, a cursor key, and the like.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic device comprising:
    a display module;
    an operation module configured to obtain operation information from a display screen of the display module;
    a communication module configured to communicate with a second electronic device;
    an obtaining module configured to obtain trace information indicating a trace of an operation performed in a direction from the electronic device toward the second electronic device or a trace of an operation performed in a direction from the second electronic device toward the electronic device based on the operation on the display screen of the electronic device and the operation on a display screen of the second electronic device; and
    a calculator configured to calculate a positional relationship between the electronic device and the second electronic device based on the trace information.

2. The electronic device of claim 1, wherein the obtaining module is configured to obtain, from the operation module, a trace of the operation performed on the display screen of the display module in the direction from the electronic device toward the second electronic device, and to obtain, from the second electronic device by the communication module, a trace of the operation performed on the display screen of the second electronic device, so as to obtain the trace information indicating the trace of the operation performed in the direction from the electronic device toward the second electronic device.

3. The electronic device of claim 1, wherein the obtaining module is configured to obtain, from the second electronic device by the communication module, a trace of the operation performed on the display screen of the second electronic device, and to obtain, from the operation module, a trace of the operation performed on the display screen of the display module in the direction from the second electronic device toward the electronic device, so as to obtain the trace information indicating the trace of the operation performed in the direction from the second electronic device to the electronic device.

4. The electronic device of claim 1, wherein
    the communication module is further configured to communicate with a third electronic device,
    the obtaining module is configured to obtain, from the second electronic device and the third electronic device, trace information indicating a trace of an operation performed in a direction from the second electronic device to the third electronic device, and
    the calculator is configured to calculate a positional relationship between the second electronic device and the third electronic device based on the trace information.

5. The electronic device of claim 4, further comprising an identification information management module configured to manage identification information with respect to each of the second electronic device and the third electronic device, wherein
    the obtaining module is configured to obtain trace information indicating a trace of an operation performed in a direction from the electronic device, passing through the second electronic device, and returning to the electronic device, and
    the calculator is configured to calculate a positional relationship among the electronic devices based on the trace information.

6. The electronic device of claim 1, further comprising a time management module configured to manage start time and end time of the trace of the operation, wherein
    the calculator is configured to calculate the positional relationship based on the start time and the end time.

7. The electronic device of claim 1, further comprising an orientation detector configured to detect orientation of the electronic device and the second electronic device, wherein
    the calculator is configured to calculate the positional relationship based on a change in the orientation of the electronic device and the second electronic device.

8. A positioning method applied to an electronic device comprising a display module, an operation module configured to obtain operation information from a display screen of the display module, a communication module configured to communicate with a second electronic device, an obtaining module, and a calculator, the positioning method comprising:
   obtaining, by the obtaining module, trace information indicating a trace of an operation performed in a direction from the electronic device toward the second electronic device or a trace of an operation performed in a direction from the second electronic device toward the electronic device based on the operation on the display screen of the electronic device and the operation on a display screen of the second electronic device; and
   calculating, by the calculator, a positional relationship between the electronic device and the second electronic device based on the trace information.

9. The positioning method of claim 8, wherein the obtaining comprises obtaining, from the operation module, a trace of the operation performed on the display screen of the display module in the direction from the electronic device toward the second electronic device, and obtaining, from the second electronic device by the communication module, a trace of the operation performed on the display screen of the second electronic device, so as to obtain the trace information indicating the trace of the operation performed in the direction from the electronic device toward the second electronic device.

10. The positioning method of claim 8, wherein the obtaining comprises obtaining, from the second electronic device by the communication module, a trace of the operation performed on the display screen of the second electronic device, and obtaining, from the operation module, a trace of the operation performed on the display screen of the display module in the direction from the second electronic device toward the electronic device, so as to obtain the trace information indicating the trace of the operation performed in the direction from the second electronic device to the electronic device.

11. The positioning method of claim 8, wherein
   the communication module is further configured to communicate with a third electronic device,
   the obtaining comprises obtaining, from the second electronic device and the third electronic device by the communication module, trace information indicating a trace of an operation performed in a direction from the second electronic device to the third electronic device, and
   the calculating comprises calculating a positional relationship between the second electronic device and the third electronic device based on the trace information obtained by the communication module.

12. The positioning method of claim 11, further comprising managing identification information with respect to each of the electronic devices, wherein
   the obtaining comprises obtaining trace information indicating a trace of an operation performed in a direction from the electronic device, passing through the second electronic device, and returning to the electronic device, and
   the calculating comprises calculating a positional relationship among the electronic devices based on the trace information.

13. The positioning method of claim 8, further comprising managing start time and end time of the trace of the operation, wherein
   the calculating comprises calculating the positional relationship based on the start time and the end time.

14. The positioning method of claim 8, further comprising detecting orientation of the electronic device and the second electronic device, wherein
   the calculating comprises calculating the positional relationship based on a change in the orientation of the electronic device and the second electronic device.

15. A computer program product applied to an electronic device comprising a display module, an operation module configured to obtain operation information from a display screen of the display module, a communication module configured to communicate with a second electronic device, an obtaining module, and a calculator, the computer program product embodied on a non-transitory computer-readable storage medium and comprising code that, when executed, causes a computer to perform:
   obtaining, by the obtaining module, trace information indicating a trace of an operation performed in a direction from the electronic device toward the second electronic device or a trace of an operation performed in a direction from the second electronic device toward the electronic device based on the operation on the display screen of the electronic device and the operation on a display screen of the second electronic device; and
   calculating, by the calculator, a positional relationship between the electronic device and the second electronic device based on the trace information.

16. The computer program product of claim 15, wherein the obtaining comprises obtaining, from the operation module, a trace of the operation performed on the display screen of the display module in the direction from the electronic device toward the second electronic device, and obtaining, from the second electronic device by the communication module, a trace of the operation performed on the display screen of the second electronic device, so as to obtain the trace information indicating the trace of the operation performed in the direction from the electronic device toward the second electronic device.

17. The computer program product of claim 15, wherein the obtaining comprises obtaining, from the second electronic device by the communication module, a trace of the operation performed on the display screen of the second electronic device, and obtaining, from the operation module, a trace of the operation performed on the display screen of the display module in the direction from the second electronic device toward the electronic device, so as to obtain the trace information indicating the trace of the operation performed in the direction from the second electronic device to the electronic device.

18. The computer program product of claim 15, wherein
   the communication module is further configured to communicate with a third electronic device,
   the obtaining comprises obtaining, from the second electronic device and the third electronic device by the communication module, trace information indicating a trace of an operation performed in a direction from the second electronic device to the third electronic device, and
   the calculating comprises calculating a positional relationship between the second electronic device and the third electronic device based on the trace information obtained by the communication module.

19. The computer program product of claim 18, further comprising managing identification information with respect to each of the electronic devices, wherein
   the obtaining comprises obtaining trace information indicating a trace of an operation performed in a direction from the electronic device, passing through the second electronic device, and returning to the electronic device, and the calculating comprises calculating a positional relationship among the electronic devices based on the trace information.

20. The computer program product of claim 15, further comprising managing start time and end time of the trace of the operation, wherein the calculating comprises calculating the positional relationship based on the start time and the end time.

* * * * *